March 26, 1929.   T. BOOTH   1,706,519
INDICATING DEVICE
Filed Oct. 18, 1926
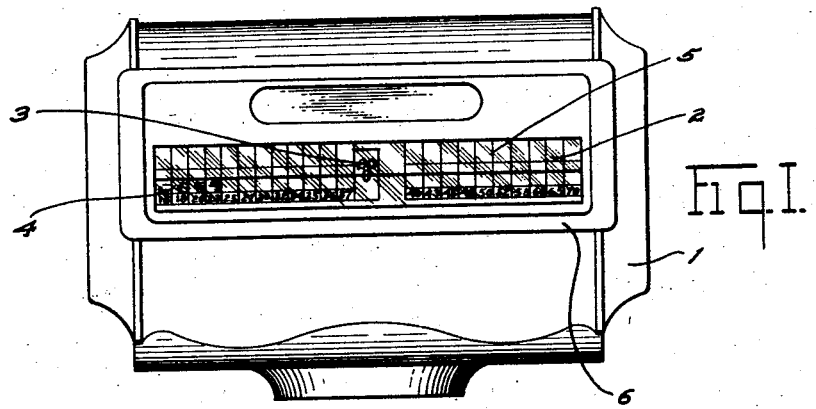
Fig. I.
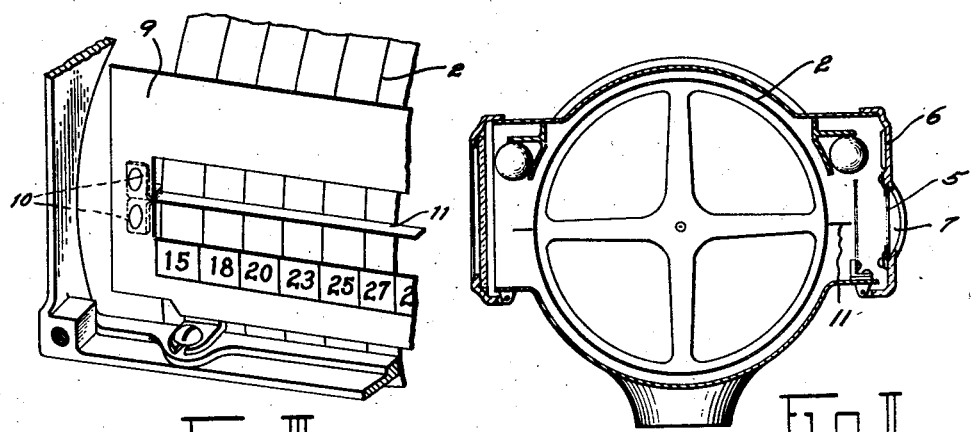
Fig. III.   Fig. II.
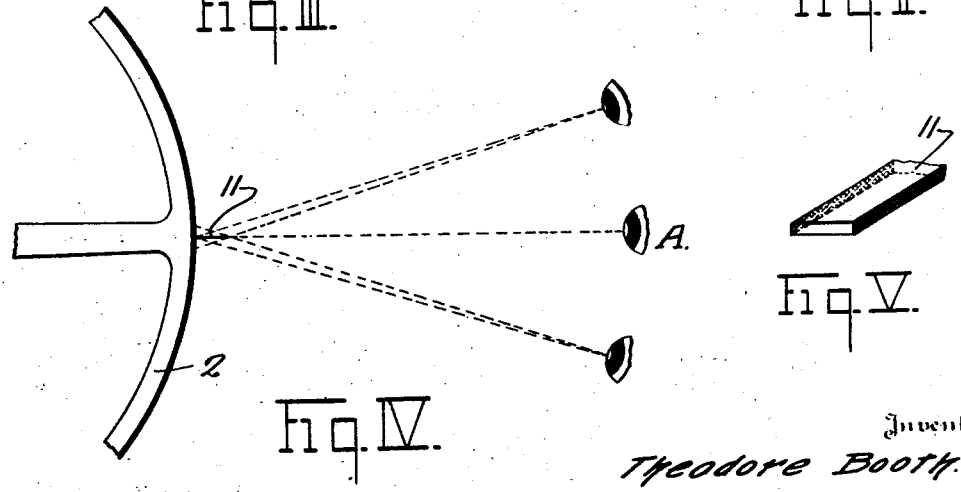
Fig. IV.   Fig. V.
Inventor
Theodore Booth.
By C.O. Marshall
Attorney Patented Mar. 26, 1929.

1,706,519

UNITED STATES PATENT OFFICE.

THEODORE BOOTH, OF TOLEDO, OHIO, ASSIGNOR TO TOLEDO SCALE COMPANY, OF TOLEDO, OHIO, A CORPORATION OF NEW JERSEY.

INDICATING DEVICE.

Application filed October 18, 1926. Serial No. 142,294.

This invention relates to indicating devices, and particularly to indicators for weighing scales, and it is especially adapted for use on scales having indicators of the so-called cylinder type, although it is to be understood that its application to other types of indicators is within the scope of my invention.

Indicating devices as applied to automatic computing weighing scales usually consist of charts bearing series of computations and indexes which indicate the particular computations to be read. Since the chart and index in a device of this kind must be relatively movable and the index must at all times remain out of contact with the chart, the index and chart are usually spaced a small fraction of an inch apart and the particular figure or graduation on the chart with which the index is in apparent registration depends upon the position of the observer. One of the principal objects of my invention is the provision of simple and effective means to indicate to the observer whether or not he is in proper reading position and thus enable him to avoid errors in reading the indication due to parallax.

Another object of the invention is to provide a single index which prevents liability of error due to parallax and yet casts no appreciable shadow on the chart.

Another object is to provide an index having reflecting surfaces which stand out prominently, thus inducing the operator to move his eyes to proper reading position.

Another object of the invention is to provide a combined reading and sighting device which will visibly indicate to the observer when he is not in correct reading position.

Another object is the provision of a reading and sighting device which is of rigid construction so that the errors due to "sagging" of the index are eliminated.

Still another object is the provision of a combined reading and sighting device which is easily manufactured and installed and is not subject to deterioration.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view of the indicator housing of a weighing scale of the cylinder type showing my invention incorporated therein;

Figure II is a vertical sectional view through the housing shown in Figure I;

Figure III is an enlarged fragmentary isometric view of certain parts of the scale mechanism;

Figure IV is a diagrammatic side elevation showing the function of the device of my invention;

Figure V is an enlarged fragmentary isometric view of a portion of the device of my invention.

Referring to the drawings in detail, the housing 1 for the indicator mechanism may be of any preferred type. Rotatably mounted within the housing is a cylindrical chart 2 having a circumferential column of weight indicating figures and graduations 3 and a plurality of columns of value graduations and computations 4. A portion of the chart 2 bearing both weight graduations and value computations is visible through an opening 5 in a lens frame 6 supported upon the chart housing 2. Mounted in the frame 6 is a reading lens 7, the exterior surface of which is a section of a cylinder, so that the apparent height of the figures on the chart and the vertical distance between the graduations are magnified when the chart is viewed through the lens.

Fixed to the housing 2 and parallel with the surface of the chart is a frame 9 bearing a series of figures representing the price-per-pound numerals. This frame is provided with a longitudinal opening through which a small portion of the chart is rendered visible. Fixedly secured to the frame 9 by means of brackets 10 and positioned in a horizontal plane passing through the axis of the chart 2 is a thin strip of transparent material 11 preferably of glass which forms the reading and sighting device of my invention. The edges of the glass strip may be tinted or colored, as shown in Figure V. The strip is preferably made very thin so that the edge will appear to the operator as a narrow line.

In reading the scale the operator moves his eye to a position in the plane of the glass strip, indicated at A in Figure IV, so that the edges of the glass appear in the same plane as a single line forming a reading index. A very slight deviation of the operator's eye from the position A will be noticed at once because light from the chart is immediately reflected from the plane surface of the glass strip into the eye of the operator and the reflected figure or portions of figures appear inverted, thus indicating to the operator that he is not in correct reading position. No reflection is visible to the operator when his eye is in the plane of the glass index strip.

It is also apparent that a tension means is not required to support the reading and sighting index because the glass is inherently rigid and the slight deflection or "sag" caused by the weight of the glass strip is so small as to be considered negligible in the practical operation of the device.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a chart, and a reading and sighting index co-operating with the chart, said reading and sighting index being of transparent material, having its surface in a plane intersecting the surface of the chart.

2. In a device of the class described, in combination, a chart, and a reading and sighting index co-operating with the chart, said reading and sighting index being of transparent material having a reflecting surface in a plane intersecting the surface of the chart.

3. In a device of the class described, in combination, a chart and a reading and sighting index co-operating therewith, said index comprising a strip of transparent material having tinted edges.

4. In a device of the class described, in combination, a chart, and a reading and sighting index comprising a strip of glass having its edge presented to the chart and adapted to co-operate therewith.

5. In a device of the class described, in combination, a chart, and a strip of transparent material, said strip having a colored edge presenting an opaque surface said opaque surface co-operating with said chart as a reading index.

6. In a device of the class described, in combination, a chart, and a strip of thin transparent material, said strip having tinted edges, said edges presenting opaque surfaces which form reading and sighting indices adapted to co-operate with the chart.

7. In a device of the class described, in combination, a chart, and a strip of thin glass, said strip of glass having colored edges, said edges presenting opaque surfaces which form reading and sighting indices adapted to co-operate with the chart.

8. In a device of the class described, in combination, a movable chart, and a stationary reading index co-operating therewith comprising a thin strip of transparent material with its edge presented to the chart.

9. In a device of the class described, in combination, a movable chart, and a stationary reading index co-operating therewith comprising a thin strip of transparent material with its edge presented to said chart, said strip having reflecting surfaces.

10. In a device of the class described, in combination, a movable chart, and a stationary reading index co-operating therewith comprising a thin strip of glass with its edge presented to said chart.

11. In a device of the class described, in combination, a chart, and a combined reading and sighting index co-operating with said chart, said index being of rigid transparent material having reflecting surfaces substantially perpendicular to the chart.

12. In a device of the class described, in combination, a chart, and a combined reading and sighting index co-operating therewith, said index comprising a strip of transparent material having a tinted edge.

13. In a device of the class described, in combination, a movable chart, and a thin strip of glass having tinted edges, said edges forming reading and sighting indices adapted to co-operate with the chart.

THEODORE BOOTH.